United States Patent [19]

Izumo

[11] Patent Number: 4,514,119
[45] Date of Patent: Apr. 30, 1985

[54] METHOD OF SHAPING A HELICAL GEAR

[75] Inventor: Masatoshi Izumo, Kyoto, Japan

[73] Assignee: Mitsubishi Jukogyo Kabushiki Kaisha, Tokyo, Japan

[21] Appl. No.: 436,685

[22] Filed: Oct. 26, 1982

[51] Int. Cl.³ .............................................. B23F 1/08
[52] U.S. Cl. ........................................ 409/60; 409/58
[58] Field of Search .............................. 409/1, 58–60, 409/42–46, 9, 47, 49, 10, 48

[56] References Cited

U.S. PATENT DOCUMENTS

| | | | |
|---|---|---|---|
| 1,082,533 | 12/1913 | Lees | 409/12 |
| 1,202,074 | 10/1916 | Lees | 409/12 |
| 1,230,940 | 6/1917 | Schurr | 409/12 |
| 1,681,994 | 8/1928 | Miller | 409/12 |
| 2,212,737 | 8/1940 | Hart | 409/10 |
| 2,674,924 | 4/1954 | Nielsen | 409/60 |
| 3,051,058 | 8/1962 | Gleasman | 409/12 |
| 3,508,462 | 4/1970 | Wildhaber | 409/46 X |

FOREIGN PATENT DOCUMENTS 137373  5/1960  U.S.S.R. .................. 409/10

Primary Examiner—William R. Briggs
Assistant Examiner—Glenn L. Webb
Attorney, Agent, or Firm—Wenderoth, Lind & Ponack

[57] ABSTRACT

A structure and method of use of a gear shaper for making a helical gear from a gear blank, and a method of use thereof. The gear shaper includes a helical guide having a lead L, a cutter spindle movable along the helical guide, and a pinion cutter on the spindle. The pinion cutter has an angle of twist $\phi$ and a normal module $m_n$ such that the quantity $Z=(L.\sin\phi)/(m_n.\pi)$ is a non-integer, a number of teeth given by the integer closest to and less than Z, a pitch circle diameter equal to $(L.\tan\phi)/\pi$, and a circular pitch which is larger than $m_n.\pi$ at one and only one location on its circular periphery and a circular $m_n.\pi$ at all other locations on its circular periphery. For a gear shaper having a helical guide of given lead L, a pinion cutter of appropriate angle of twist $\phi$ and normal module $m_n$ can be utilized to manufacture a helical gear of angle of twist $\phi$ and module $m_n$ by separating the cutter and blank and providing appropriate angular adjustment of the pinion cutter as the portion of the pinion cutter of wider pitch approaches the gear blank.

4 Claims, 4 Drawing Figures

METHOD OF SHAPING A HELICAL GEAR

BACKGROUND OF THE INVENTION

1. Field of the Invention

This invention relates to a method of shaping a helical gear, and a pinion cutter used therein.

2. Description of the Prior Art

FIG. 1 shows the head portion of a pinion cutter 1 employed in a gear shaper for the formation of a helical gear. The pinion cutter has an angle $\phi$ of twist which is equal to that on a gear blank G (FIG. 4), but a direction of twist which is opposite to that on the gear blank G. A cutter shaft 2 carrying the pinion cutter 1 is supported on a cutter-spindle 4 which is guided by a helical guide 3. The shaft 2 is adapted to make a spiral reciprocal motion along a spiral groove on the helical guide 3. The spiral groove of the helical guide 3, of which an exploded view is shown in FIG. 3, has a lead L which is determined by the normal module $m_n$ and the angle of twist $\phi$ specified on the gear blank G, and the number of teeth Z on the pinion cutter 1. The pinion cutter 1 has a normal module $m_n$ and an angle of twist $\phi$ which are equal to those on the gear blank G. Thus, the spiral lead L is expressed by equation (1):

$$L = \frac{m_n \cdot Z \cdot \pi}{\sin \phi} \quad (1)$$

where
L = spiral lead on the helical guide (mm);
$m_n$ = normal module on the pinion cutter (mm);
Z = number of teeth on the pinion cutter; and
$\phi$ = angle of twist on the pinion cutter (°).

The number Z of teeth on the pinion cutter 1 is one of the factors on which the spiral lead L depends, as is obvious from equation (1). In the event there is a change in the normal module $m_n$ or the angle $\phi$ of twist on the gear blank, however, a change in the number Z of teeth on the pinion cutter does not always serve to maintain the spiral lead L at an equal value, since the number Z is always a integer. Accordingly, if a gear material having a different normal module $m_n$ or angle $\phi$ of twist is employed, it has hitherto been necessary to use a different pinion cutter, a different helical guide having a different spiral lead L, and a different slider. The change of the helical guide and the slider is, however, not only a time-consuming job, but also requires a high level of skill for adjustment, resulting in a reduction in operating efficiency. Moreover, it is very uneconomical to keep a lot of different helical guides and sliders, since they are expensive.

SUMMARY OF THE INVENTION

It is an object of this invention to provide a method which enables the manufacture of a helical gear having any desired angle of twist, and module with a single combination of a helical guide and a slider by simply changing the pinion cutter, so that the gear may be manufactured at a low cost with a high degree of operating efficiency.

It is another object of this invention to provide a pinion cutter which is suitable for use in the manufacture of a helical gear according to the method of this invention.

According to this invention, there is provided a pinion cutter for making a helical gear which pinion cutter has a number N of teeth equal to the integer portion of the quantity Z $$Z = \frac{L \cdot \sin\phi}{m_n \cdot \pi}$$

where
L = lead;
$\phi$ = angle of twist;
$m_n$ = module;
Z is a number not an integer.

Thus, the pinion cutter is free from the incomplete tooth that would appear if the number of teeth were strictly defined by the number Z, the incomplete tooth being replaced by a widened tooth groove.

According to the method of this invention, when the widened tooth groove portion on the pinion cutter has approached a gear blank, the tooth cutting operation is resumed either after the gear blank and the pinion cutter have been returned to their initial positions, or after only the pinion cutter has been rotated until the widened tooth groove portion passes a point of contact between the pinion cutter and the gear blank.

DETAILED DESCRIPTION OF THE INVENTION

In accordance with one preferred embodiment of the invention, the number Z of teeth on the pinion cutter is expressed by equation (2):

$$Z = \frac{L \cdot \sin \phi}{m_n \cdot \pi} \quad (2)$$

where L, $\phi$ and $m_n$ are as defined above such that Z is equal to a non-integer which may be expressed as a decimal fraction. If the spiral lead L is constant, Z may represent a number having a decimal fraction, depending on the module $m_n$ or the angle $\phi$ of twist. Although there has hitherto not been any gear having a number of teeth expressed by a number containing a decimal fraction, this invention is based on a gear having a number of teeth represented by a number containing a decimal fraction. The pinion cutter has a pitch circle diameter d expressed by equation (3), hence (3)', in which the spiral lead L is a constant, and the angle $\phi$ of twist depends on the gear blank:

$$d = \frac{Z \cdot m_n}{\cos \phi} \text{ or}$$

$$d = \frac{L}{\pi} \tan \phi.$$

Figure 1:
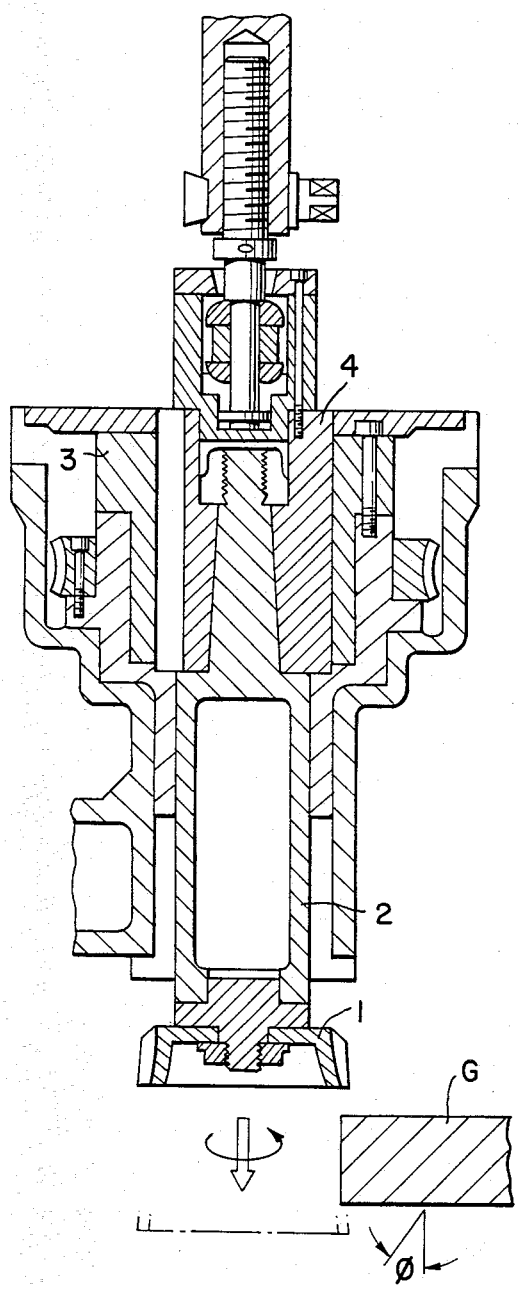
FIG. 1 is a longitudinal sectional view showing the head portion of a pinion cutter in a gear shaper.
Figure 2:
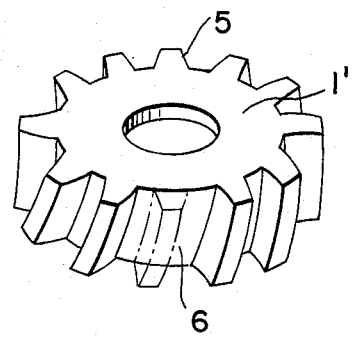
FIG. 2 is a perspective view of a pinion cutter embodying this invention.
Figure 3:
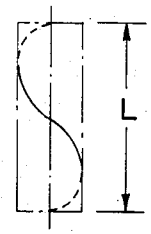
FIG. 3 is an exploded view of a spiral groove on a helical guide.
Figure 4:
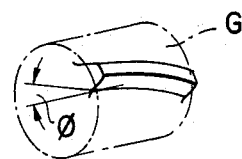
FIG. 4 is a perspective view of a gear blank.

If a special pinion cutter having a pitch circle diameter d expressed by equation (3)', and a normal module $m_n$ and an angle $\phi$ of twist which are equal to those on the gear blank is employed, it is not necessary to change the spiral lead L. This pinion cutter may include a tooth groove having a width which is larger than $m_n \cdot \pi/2$, or smaller than $m_n \cdot \pi$, or an incomplete tooth. If any such incomplete tooth is formed, it is preferable to remove any such tooth, and provide therein a tooth groove having a width which is larger than $m_n \cdot \pi/2$. If the number Z of teeth is, for example, 11.6, there is obtained a pinion cutter 1' having 11 complete teeth, and a tooth groove 6 having a width larger than $m_n \cdot \pi/2$, as shown in FIG. 2. The teeth 5 having a spacing represented as $m_n \cdot \pi$ are used for shaping a gear. The pinion cutter 1' has a pitch along the teeth 5 which is equal to that on the gear blank, and expressed as $m_n \cdot \pi$, while the two adjoining teeth 5 between which the groove 6 exists have a different pitch. It is, of course, possible to form a pinion cutter with less than 11 complete teeth. The pinion cutter of this invention is easy to manufacture if an appropriate indexing device is employed.

The method of this invention is characterized by using the pinion cutter as hereinabove described. The pinion cutter is formed with a pitch circle diameter d conforming to any desired normal module $m_n$ and angle $\phi$ of twist on the gear blank. The pinion cutter is secured to a cutter spindle, and its teeth having a spacing expressed as $m_n \cdot \pi$ are used for the generating and cutting operation in a customary manner. If a cutter portion having a different groove width has approached the gear blank, the gear blank is moved away from the pinion cutter, and the cutter spindle and the work table are rotated in a reverse direction at a faster speed so that they may be returned to their initial positions to resume the generating and cutting operation. Alternatively, the work table is moved away from the pinion cutter, and the pinion cutter is rotated at a faster speed so that the cutter portion having a different groove width may pass a point of contact between the cutter and the gear material, if the phase of any such cutter portion is adjusted between the cutter spindle and the work table. The discontinuous rotation between the cutter spindle and the work table is easy to accomplish if they are driven in accordance with a program established by a numerical computer system. It is needless to say that if the number Z according to equation (2) were a natural number, it is possible to use an ordinary pinion cutter.

As is obvious from the foregoing description, this invention employs a special pinion cutter formed with a portion having a different groove width to achieve a discontinuous generating motion to enable the manufacture of a variety of helical gears having different angles of twist and modules with a single combination of a helical gear and a slider only if the pinion cutter is changed.

What is claimed is:

1. A pinion cutter for use in a gear shaper having a helical guide having a spiral lead of length L, for making a helical gear from a gear blank, said pinion cutter having:
   (1) an angle of twist $\phi$ and a normal module $m_n$ such that the quantity $$Z = \frac{L \cdot \sin\phi}{m_n \cdot \pi}$$

is a non-integer;
   (2) a number of teeth given by the integer closest to and less than Z;
   (3) a pitch circle diameter equal to $(L \cdot \tan \phi)/\pi$; and
   (4) a circular pitch which is larger than $m_n \cdot \pi$ at one and only one location on its circular periphery and a circular pitch $m_n \cdot \pi$ at all other locations on its circular periphery.

2. A method of making a helical gear from a gear blank, with a gear shaper having a cutter spindle movable in a helical guide having a spiral lead of length L in a longitudinal direction, comprising the steps of:
   (1) providing on the spindle a pinion cutter having an angle of twist $\phi$, a pitch circle diameter d and a module $m_n$ such that $d = (L/\pi) \cdot \tan \phi$, the quantity $$Z = \frac{L \cdot \sin\phi}{m_n \cdot \pi}$$

is a non-integer, and the pinion cutter has a number of teeth given by the integer closest to and less than Z, the pinion cutter having a circular pitch which is larger than $m_n\pi$ at one and only one location on its circular periphery and a pitch equal to $m_n \cdot \pi$ at all other locations on its circular periphery;
   (2) imparting a spiral motion to said spindle along the helical guide while rotating the gear blank such that the teeth of the pinion cutter cut into the periphery of the gear blank; and
   (3) interrupting said step of imparting spiral motion to said spindle as the portion of said pinion cutter of circular pitch larger than $m_n\pi$ approaches the gear blank, to seperate the gear blank and pinion cutter, and return the pinion cutter and gear blank to their original longitudinal and rotational positions, and then repeating said step of imparting spiral motion.

3. A method of making a helical gear from a gear blank, with a gear shaper having a cutter spindle movable in a helical guide having a spiral lead of length L in a longitudinal direction, comprising the steps of:
   (1) providing on the spindle a pinion cutter having an angle of twist $\phi$, a pitch circle diameter d and a module $m_n$, such that $d = (L/\pi) \cdot \tan \phi$, the quantity $$Z = \frac{L \cdot \sin\phi}{m_n \cdot \pi}$$

is a non-integer, and the pinion cutter has a number of teeth given by the integer closest and less than Z, the pinion cutter having a circular pitch which is larger than $m_n \cdot \pi$ at one and only one location on its circular periphery and a pitch equal to $m_n$ at all other locations on its circular periphery;
   (2) imparting a spiral motion to said spindle along the helical guide while rotating the gear blank such that the teeth of the pinion cutter cuts the periphery of the gear blank; and
   (3) interrupting said step of imparting spiral motion to said spindle as the portion of the pinion cutter of circular pitch, larger than $m_n \cdot \pi$, approaches the gear blank, to separate the gear blank and the pinion cutter and increase the speed of the spindle relative to the gear blank until said portion has passed a point of contact with the gear blank, and the resuming said step of imparting spiral motion.

4. A gear shaper for making a helical gear from a gear blank, comprising:
   a. a helical guide having a spiral lead of length L;
   b. a cutter spindle movable along said helical guide; and c. a pinion cutter on said spindle, said pinion cutter having:
(1) an angle of twist $\phi$ and a normal module $m_n$ such that the quantity $$Z = \frac{L \cdot \sin\phi}{m_n \cdot \pi}$$

is a non-integer;
(2) a number of teeth given by the integer closest to and less than Z;
(3) a pitch circle diameter equal to $(L \cdot \tan\phi)/\pi$; and
(4) a circular pitch which is larger than $m_n \cdot \pi$ at one and only one location on its circular periphery and a circular pitch $m_n \cdot \pi$ at all other locations on its circular periphery.

* * * * *